(12) United States Patent
Quantz et al.

(10) Patent No.: US 7,197,977 B2
(45) Date of Patent: **\*Apr. 3, 2007**

(54) APPARATUS FOR SUCCESSIVELY DELIVERING NUTS TO A HIGH PRODUCTION NUTCRACKER

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/201,827

(22) Filed: Aug. 11, 2005

(65) Prior Publication Data

US 2007/0034097 A1 Feb. 15, 2007

(51) Int. Cl.
*A23N 5/00* (2006.01)
(52) U.S. Cl. .............. 99/571; 99/574; 99/581
(58) Field of Classification Search .......... 99/571–576, 99/577–579, 568, 580–583; 426/481, 482; 30/120.1–120.5; 198/622
See application file for complete search history.

(56) References Cited

U.S. PATENT DOCUMENTS

| | | | |
|---|---|---|---|
| 3,871,275 A | * | 3/1975 | Quantz ........................ 99/571 |
| 4,332,827 A | | 6/1982 | Quantz |
| 4,418,617 A | * | 12/1983 | Quantz ........................ 99/571 |
| 4,441,414 A | * | 4/1984 | Quantz ........................ 99/571 |
| 5,623,867 A | | 4/1997 | Quantz |
| 6,182,562 B1 | * | 2/2001 | Quantz et al. ................ 99/571 |
| 6,205,915 B1 | | 3/2001 | Quantz |
| 6,270,824 B1 | | 8/2001 | Quantz |
| 6,397,737 B1 | * | 6/2002 | Eisel ........................... 99/571 |
| 6,584,890 B1 | | 7/2003 | Quantz et al. |
| 6,588,328 B1 | | 7/2003 | Quantz et al. |
| 6,766,732 B1 | * | 7/2004 | Quantz et al. ................ 99/571 |
| 6,772,680 B1 | | 8/2004 | Quantz et al. |
| 6,851,353 B1 | * | 2/2005 | Quantz et al. ................ 99/571 |

* cited by examiner

*Primary Examiner*—Timothy F. Simone
(74) *Attorney, Agent, or Firm*—Alston & Bird LLP

(57) ABSTRACT

An apparatus for successively delivering nuts from a hopper to a high production nutcracker. An endless conveyor extends through the hopper and includes a plurality of nut transport elements which pick up the nuts in a receptacle formed in the upper surface of each element. To insure that only one nut is received in each receptacle, each element is provided with a longitudinal slot in one of the sides of the element which communicates with the receptacle, and a pivotally mounted singulating arm extends into the slots of the advancing elements to eject any excess nuts from each receptacle. To accommodate nuts of different average size, the pivotal position of the singulating arm is adjustable by means of an actuating wheel positioned on the outside of the hopper.

10 Claims, 4 Drawing Sheets

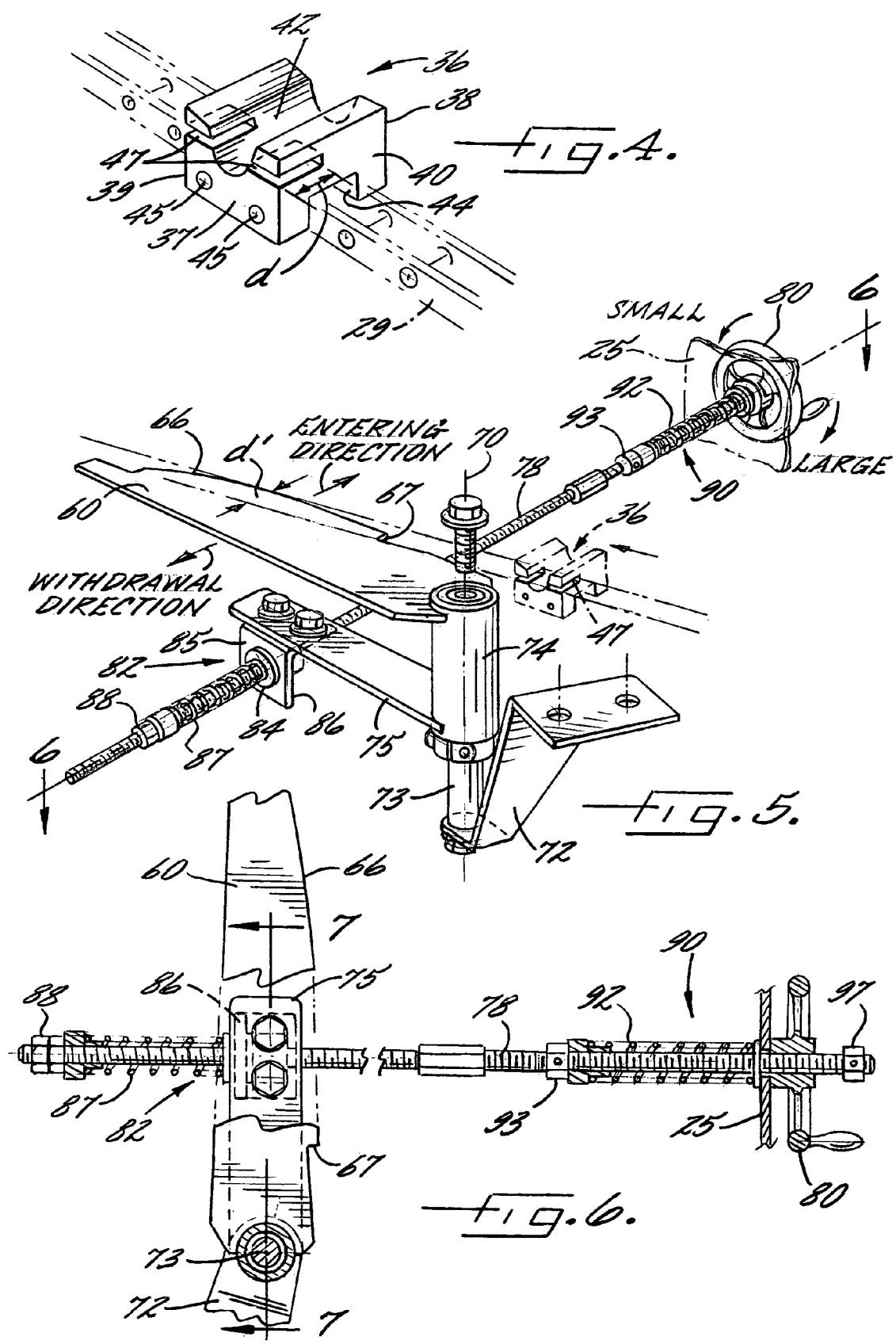

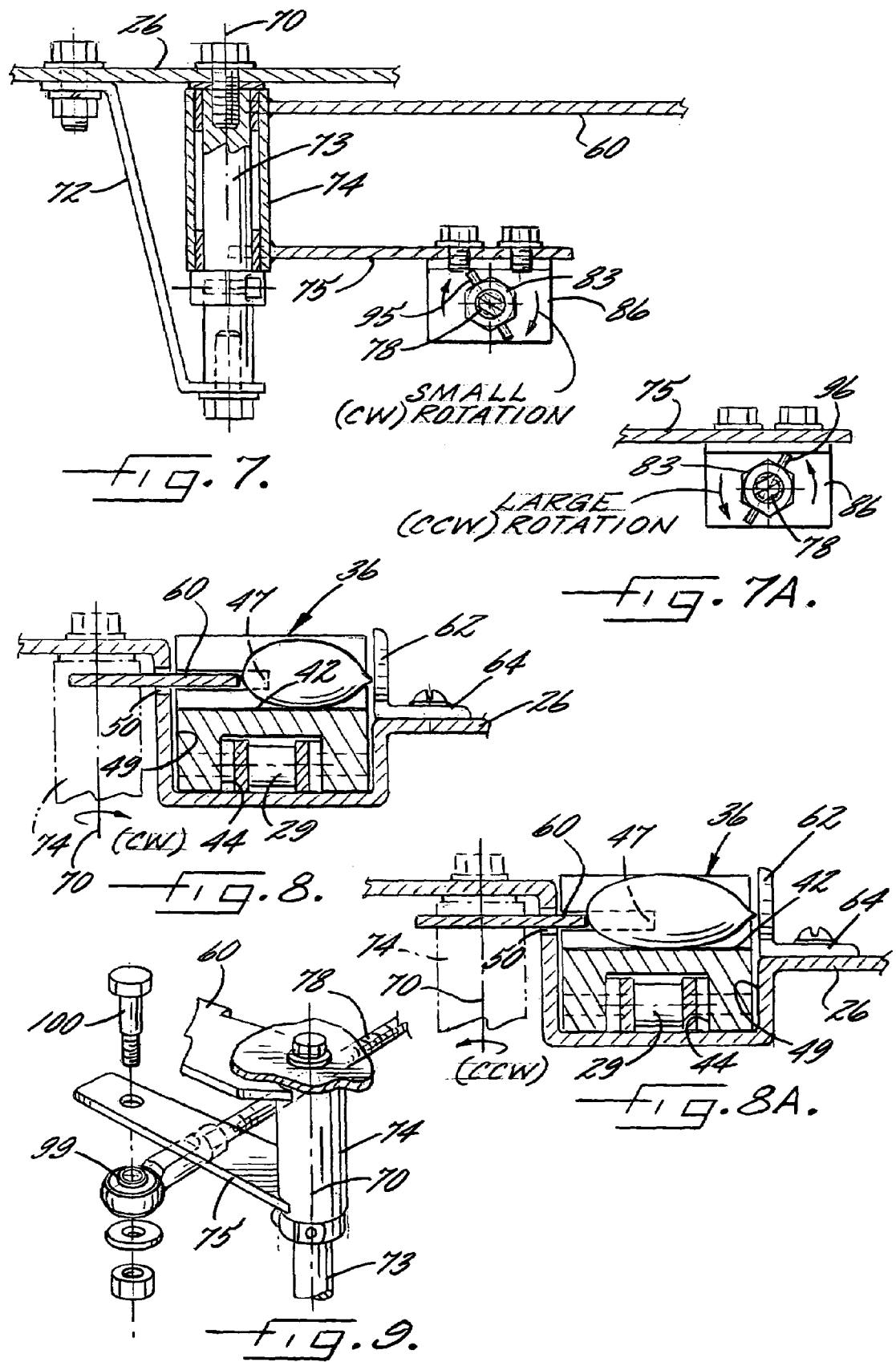

APPARATUS FOR SUCCESSIVELY DELIVERING NUTS TO A HIGH PRODUCTION NUTCRACKER

BACKGROUND OF THE INVENTION

The present invention relates to a nut delivery apparatus for a high speed nutcracker and which can be efficiently adjusted to accommodate nuts of different average size.

U.S. Pat. Nos. 4,332,827; 5,623,867; 6,205,915; 6,270,824; 6,584,890, 6,588,328; and 6,772,680 all disclose a high speed nutcracking apparatus which includes a rotatable turret which mounts a plurality of cracking units arranged about is periphery, with each cracking unit having an opening adapted to receive an individual nut from a feed conveyor which comprises a plurality of nut transport elements mounted in succession on a feed chain. Each of the nut transport elements includes an upwardly open traverse receptacle for holding an individual nut, and each cracking unit on the turret has an anvil which is moved axially into the receptacle at a pick up point so that the nut is engaged between the anvil and a crack die on the other side of the opening.

In operation, the feed conveyor moves tangentially past the rotating turret so that the anvils of the cracking units enter the receptacles of respective nut transport elements at the pick up point and engage and pick up the nut. After the cracking unit and engaged nut have moved away from the pick up point and reach a cracking location, the crack die of the cracking unit is impacted by a shuttle so that the crack die applies an impact to the nut to crack the shell.

As will be apparent, it is important that the nut delivery system be able to deliver a single nut in the receptacle of each nut transport element, and that the nut be oriented with its end to end direction aligned in the receptacle. To achieve this objective, the prior feeding systems include an arrangement to singulate and orient the nuts as they are received in the receptacles of the nut transport elements and as the elements move through the hopper. For example, and as disclosed in U.S. Pat. No. 6,205,915, the hopper includes an orienting deflecting plate which is designed for laterally deflecting the upper portion of any upstanding nuts disposed in each receptacle. To singulate the nuts in each receptacle, there is provided a singulating arm in the form of a wire which extends into a slot in one side of each of the advancing nut transport elements, and which serves to laterally eject any laterally oriented nuts in excess of one from each receptacle. The wire arm is mounted for pivotal adjustment about a mounting pin.

Pecans, for example, vary significantly in size, and they are typically run through a sizing machine prior to cracking so as to separate the nuts into different grades. To adjust the singularizing and orienting arrangement to efficiently process nuts of different sizes, the singulating wire arm as shown in FIG. 3 of the '915 patent is pivotally adjusted to vary the distance the arm extends into the slots of the advancing nut transport elements. Thus for smaller nut grades, the arm is pivoted to extend further into the slots, and for larger grades, the arm is pivoted to extend a lesser extent into the slots.

The adjustment of the singulating wire arm as described above, is not without difficulty, since the arm is often buried under the nuts in the hopper and it is not easily seen or reached. Also, the adjustment must be done on a trial and error basis, and the correctness of the adjustment can only be verified after the machine has been run and the efficacy of the cracking operation has been observed.

A further deficiency of the singulating wire as shown for example in the '915 patent, is the fact that the arm is somewhat flexible and it can be deflected out of the slots by debris in the form of shell fragments which tend to build up in the slots. Finally, the wire arm may be bent and change shape during prolonged use, which further compromises its ability to properly function.

It is accordingly an object of the present invention to provide an improved singulating and orienting means for a nut delivery system of the described type, and which effectively overcomes the above noted limitations and disadvantages of the prior systems.

It is a more particular object of the present invention to provide a nut singulating arm which is adjustable from a location outside the hopper, and which largely avoids trial and error in determining a proper setting of the position of the arm in the slots of the advancing nut transport elements.

It is still another object to provide a nut singulating arm which is structured to remove shell fragments and other debris from the slots of the nut transport elements, and which is sufficiently strong to resist bending or deflection.

SUMMARY OF THE INVENTION

The above and other objects and advantages of the invention are achieved by the provision of an apparatus for successively delivering nuts from a hopper to a cracking head of a nutcracker, and which incorporates an endless conveyor composed of a plurality of nut transport elements mounted in succession along a feed chain and which moves through the hopper. The nut transport elements each incorporate an upwardly facing receptacle for receiving the nuts, and to insure that only one nut is received in the receptacle of each nut transport element, there is provided means for ejecting the excess nuts which comprises a longitudinal slot in one side of each nut transport element and which communicates with the receptacle. Also, a singulating arm is pivotally mounted in the hopper so as to enter the slots of the advancing elements and laterally deflect each excess nut so that it is removed from the receptacle. Means for adjusting the lateral extent to which the arm extends into the slots of the advancing elements is also provided, to thereby permit adjustment for differently sized nuts which are being processed by the nutcracker. The actuating means includes an actuating member located on the outside of the hopper where it is easily accessible to the machine operator.

In a preferred embodiment, the adjusting means comprises a control rod connected between the arm and the actuating member, and the arm is pivotally mounted in the hopper. The actuating member acts to axially move the rod in either direction to thereby pivot the arm in either direction. Also, the control rod is preferably connected to the arm by a spring loaded connection, which permits the arm to be moved out of the slots against the biasing force of the spring loaded connection should an immovable obstruction in the slots be encountered. Thus damage to the arm or the elements can be avoided.

The actuating member preferably comprises a wheel which is threadedly connected to the control rod and which is mounted against the outside of a side wall of the hopper, and the wheel forms part of a means for advancing and retracting the rod whereby the position of the rod with respect to the wheel provides an accurate visual indication of the extent to which the arm enters the slots. The initial setup of the machine for processing nuts of a particular size is facilitated.

BRIEF DESCRIPTION OF THE DRAWINGS

Figure 1:
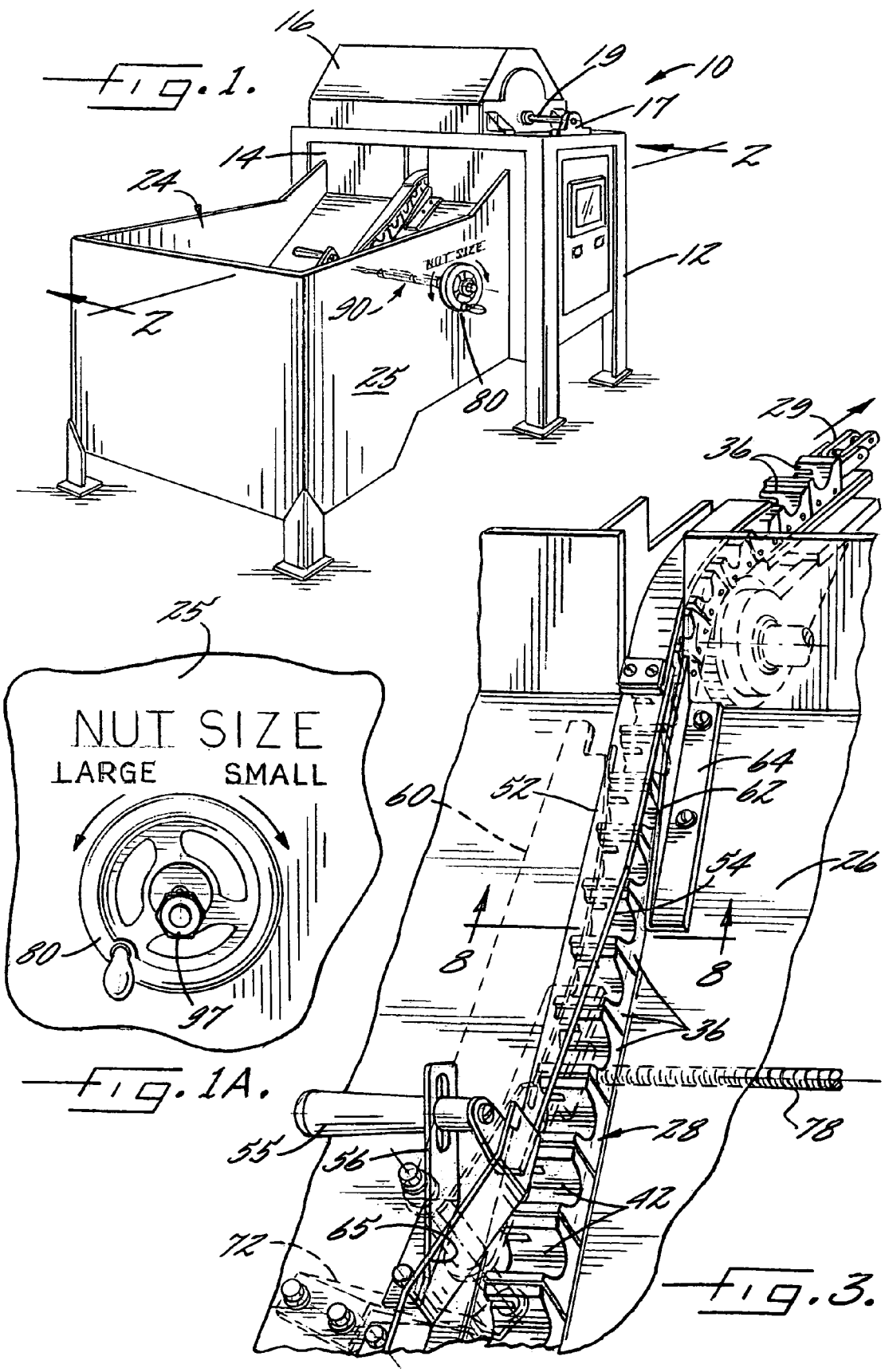
Figure 2:
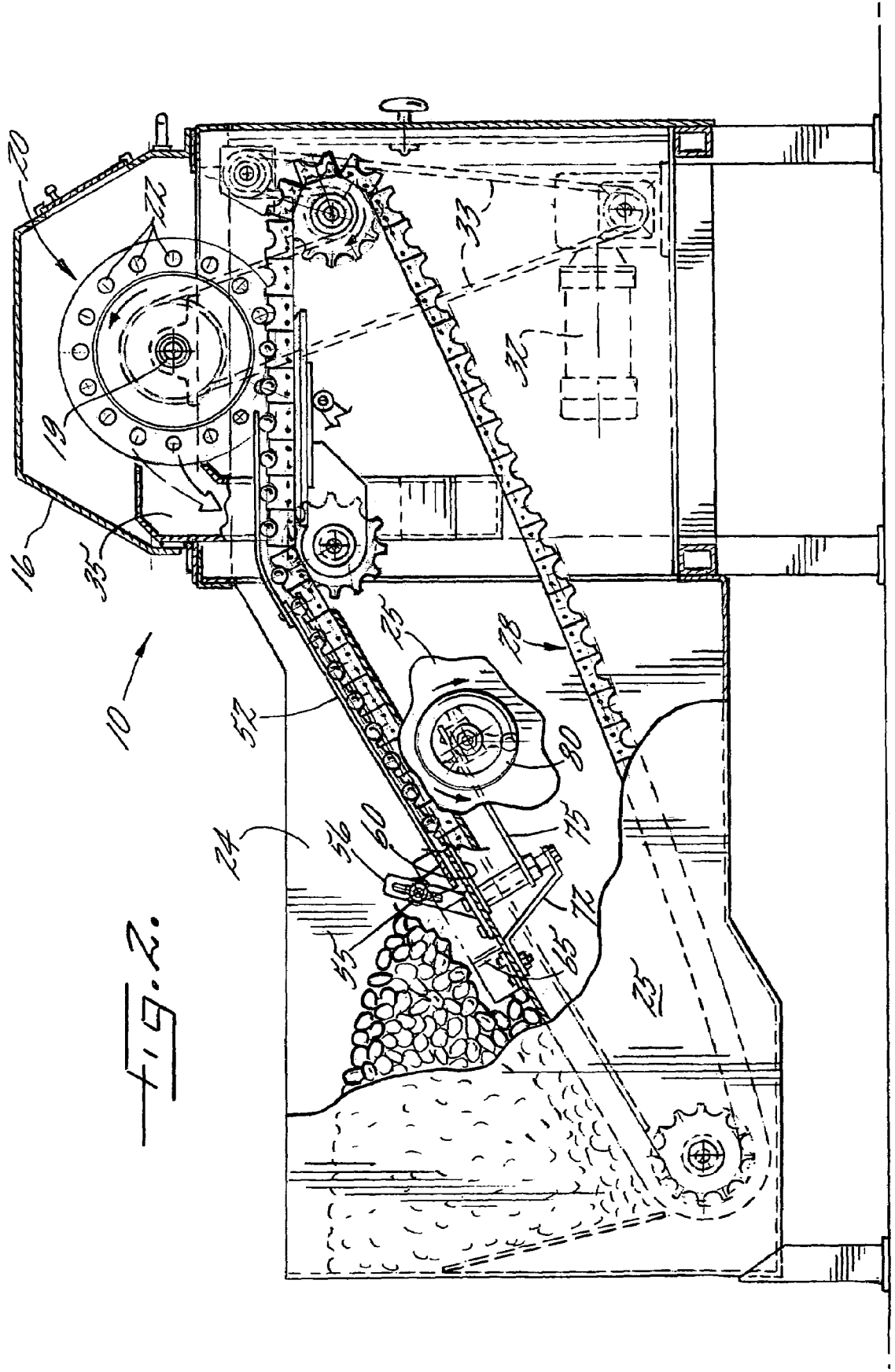

Having thus described the invention in general terms, reference will now be made to the accompanying drawings, which are not necessarily drawn to scale, and wherein:

FIG. 1 is a perspective view of a high production nut-cracking apparatus which embodies the features of the present invention;

FIG. 1A is a fragmentary view of the acuating wheel of the apparatus;

FIG. 2 is a sectional side elevation view taken along the line 2—2 of FIG. 1;

FIG. 3 is a fragmentary perspective view of the singularizing and orienting means associated with the feed conveyor of the present invention;

FIG. 4 is a fragmentary perspective view of one of the nut transport elements of the feed conveyor;

FIG. 5 is a fragmentary perspective view of the means for adjusting the position of the singulating arm of the present invention;

FIG. 6 is a fragmentary top plan view of the adjusting means;

FIG. 7 is a sectional view taken along the line 7—7 of FIG. 6;

FIG. 7A is a fragmentary view of a portion of FIG. 7, but showing opposite rotation of the adjusting wheel;

FIG. 8 is a fragmentary sectional view of one of the nut transport elements and showing the position of the singulating arm when a relatively small nut is being processed;

FIG. 8A is a view similar to FIG. 8 but showing the position of the arm for a larger nut; and FIG. 9 is an exploded perspective view of a second embodiment of the adjusting means for the singulating arm.

DETAILED DESCRIPTION OF THE PREFERRED EMBODIMENT

The present invention now will be described more fully hereinafter with reference to the accompanying drawings, in which a preferred, but not necessarily all embodiments of the invention is shown. Indeed, the invention may be embodied in many different forms and should not be construed as limited to the embodiment set forth herein. Rather, the illustrated embodiment is provided so that this disclosure will satisfy applicable legal requirements. Like numbers refer to like elements throughout.

Referring more particularly to the drawings, FIGS. 1–8 illustrate the structural features of a high production nut-cracking apparatus 10 which embodies the present invention. As will become apparent, many of the components of the present apparatus conform to the corresponding components of the apparatus shown and described in the prior U.S. Patents which are listed above under the heading Background of the Invention. The disclosures of these prior patents are expressly incorporated herein, and reference may be had to these prior patents for a more detailed description of the common components.

The apparatus 10 comprises a frame which defines a box-like cabinet 12 which includes a rear side 14. A hood 16 is pivotally mounted to the top of the cabinet and so as to be pivotable between a closed position (FIGS. 1 and 2) and an open position (not shown). Also, the upper edge of the cabinet 12 supports a pair of bearing blocks 17 (only one being seen) which rotatably mount a central shaft 19 which defines a horizontal central axis.

A cracking assembly in the form of a turret 20 is fixedly mounted to the shaft 19 so as to be rotatable with the shaft about the central axis. The turret 20 comprises a plurality of elongate cracking units 22 which are circularly arranged about the shaft and supported by radially disposed plates (not shown). There are sixteen cracking units in the illustrated embodiment and the units extend generally parallel to each other and to the central axis.

The structure and function of the cracking units 22 are otherwise fully disclosed in the prior patents listed above and which are incorporated by reference.

The apparatus 10 of the present invention further includes means for advancing and delivering a plurality of nuts individually in succession along a path of travel to the rotating turret 20. This nut delivering means includes a hopper 24 for storing a relatively large quantity of nuts to be cracked, and which is fixed to the rear side 14 of the cabinet 12. The hopper 24 includes a side wall 25 and a bottom wall 26 which are further described below.

An endless feed conveyor 28 is provided which includes a feed chain 29 and which has an upper run which as best seen in FIG. 2 extends through the hopper along an upwardly inclined segment, through a curved transition junction, and then along a horizontal segment to a delivery point adjacent the bottom dead center position of the turret 20, all as further described in the prior patents which are incorporated by reference.

The turret 20 is rotatably driven by a motor 32 and chain drive 33 (FIG. 2) and operates so that each cracking unit 22 picks up a nut from the conveyor 28 at the bottom dead center position of the turret. With continued rotation of the turret, the nut is stressed at about the 11 o'clock position of the turret when viewed as seen in FIG. 2 and with the turret rotating in the counterclockwise direction. Immediately thereafter, the nut is cracked, and the cracked nut falls into a delivery chute 35 which exits on the side of the cabinet 12.

A plurality of block-like nut transport elements 36 are mounted in succession along the feed chain 29. As best seen in FIGS. 3 and 4, and as further illustrated in U.S. Pat. No. 5,623,867, each element 36 includes parallel opposite sides 37, 38, parallel opposite ends 39, 40, and top and bottom faces (not numbered). A generally semi-cylindrical receptacle 42 extends laterally across the upper face of each element, and so as to communicate with both sides thereof. By design, each receptacle 42 is sized to supportingly receive a single nut to be cracked which is oriented with its end to end direction extending axially along the receptacle.

Each element 36 further includes a longitudinally channel 44 in the bottom face for receiving the feed chain 29, and a pair of transverse pins 45 serve to interconnect the element to the chain. Further, each element 36 includes a slot 47 which extends longitudinally along the full length of the front side 37 as seen in FIG. 4, and which is disposed parallel to the bottom face of the element. The slot 47 extends laterally a portion of the distance across the element as indicated by the arrow d in FIG. 4, and communicates with the receptacle 42. The portion of the top face forwardly of receptacle may be inclined downwardly, so that the portion rearwardly of the receptacle in effect protrudes upwardly so as to catch the nuts in the hopper and knock them into the receptacle.

The bottom wall 26 of the hopper includes a channel 49 along which the nut transport elements 36 advance, note FIG. 8. One side wall of the channel includes a slot 50 for the purposes described below.

The hopper 24 includes singularizing and orienting means to ensure that any nuts in excess of one are removed from the receptacle 42 of each nut transport element 36, and that each nut is oriented with its end to end direction extending axially along the receptacle 42. This singularizing and orienting means includes a deflecting plate 52 which is designed for laterally deflecting the upper portion of any upstanding nuts disposed in each receptacle toward the right side of the element as seen in FIG. 3, as the elements move through the hopper, to thereby laterally orient the nuts. The plate 52 has a forward edge 54, and a length sufficient to continuously overlie the path of the nut transport elements 36 from a point midway along the upwardly inclined segment, along the transition junction, and to a point immediately upstream of the delivery point. In addition, the plate 52 is mounted in the hopper so that the forward edge 54 extends diagonally across the path of the elements. The plate 52 is pivotally connected adjacent its upstream end for pivotal movement about a horizontal axis defined by the anchoring pin 55, and such that the plate may be lifted upwardly from the elements 36 in the event a foreign object, such as a rock, enters the hopper and moves between the elements 36 and the plate 52. The pin 55 is in turn mounted to the bracket 56 so as to permits its elevation to be adjusted, and thus permit the elevation of the upstream end of the plate 52 to be adjusted.

The singularizing and orienting means of the apparatus further includes means for laterally ejecting any laterally oriented nuts in excess of one from each receptacle 42. This ejecting means comprises a singulating arm 60, which is mounted in the hopper so that the arm extends a predetermined lateral distance d' (FIG. 5) into the slot 47 of each advancing element 36, to thereby deflect each nut therein which is adjacent the left side and so that it moves toward the right side. The arm 60 is mounted for pivotal movement as further described below, and is typically positioned to extend into the slot 47 so that the distance between the innermost portion of the arm and the right side of the elements 36 corresponds to the average length of the nut being processed. Thus in the event two relatively small nuts are positioned in any receptacle in end to end alignment, the arm 60 will serve to eject the one closest to the right side. It will also be noted from FIG. 3 that the elongate deflecting plate 52 overlies the operative position of the singulating arm 60, and thus serves to prevent nuts from lifting upwardly from the associated receptacle 42 upon being contacted by the arm 60.

The hopper 24 also mounts an upwardly inclined guide surface 62 which is formed on an upright arm of an angle bracket 64 along the right side of the channel 49 in the bottom wall 26, and downstream of the deflecting forward edge 54 of the plate 52 and the singulating arm 60. The guide surface 62 is positioned so as to contact that portion of any nut extending laterally from its supporting receptacle 42 on the right side, and acts to move the nut back into the receptacle.

The bottom wall 26 of the hopper also mounts a guide plate 65 which is positioned upstream of the deflecting plate 52 and so as to extend laterally across the left edge portion of the feed conveyor 28 as seen in FIG. 3. The guide plate 65 serves to deflect any nuts that are standing up in the left side of the receptacles 42 of the nut transport elements 36, and thereby prevents such nuts from impacting and catching under the upstream end of the deflecting plate 52.

The singulating arm 60 of the present invention is best illustrated in FIGS. 5–7. As there illustrated, the arm 60 comprises a flat, relatively rigid metal plate, which has a thickness somewhat less than the width of the slots 47 in the nut transport elements 36. An edge portion 66 of the arm 60 is positioned to be received in the slots 47 as the elements move past the arm, note FIG. 5. The upstream end of the edge portion 66 includes an abutment 67 which is transverse to the slots 47 and serves to remove any shell fragments or other debris from the slots.

The arm 60 is mounted for pivotal movement about an axis 70 which is perpendicular to the direction of the advancing elements 36, note FIG. 5, and so that the pivotal movement of the arm 60 about the pivotal axis 70 causes the lateral extent d' of the edge portion 66 of the arm in the slots to be varied, compare FIGS. 8 and 8A. The mounting arrangement for the arm 60 comprises a mounting bracket 72 which is fixed to the underside of the bottom wall 26 of the hopper 24, and the bracket 72 mounts a post 73 which is also fixed to the bottom wall of the hopper, note FIG. 7, and which defines the pivotal axis 70. A sleeve 74 is rotatably supported on the post 73, and the arm 60 is fixed to the upper end of the sleeve 74 so as to extend radially therefrom. A radial leg 75 is joined to the lower end of the sleeve 74 so as to extend below and parallel to the arm 60. The arm 60 is mounted at an elevation so that it extends through the slot 50 in the side wall of the channel 49 in the bottom wall 26 of the hopper and so as to be adapted to enter the slots 47 of the elements 36 as they advance along the channel 49.

The means for adjusting the lateral extent of the arm 60 into the slots 47 comprises a threaded control rod 78 which is connected between the arm 60 and an actuating wheel 80 which is located on the outside of the side wall 25 of the hopper 24. More particularly, the control rod 78 is connected to the arm 60 by a connection 82 which comprises a stop nut 83 which is threadedly received and fixed on the rod 78, and a sleeve 84 which is mounted to the depending shoulder 85 of an angle bracket 86 which in turn is bolted to the leg 75. The sleeve 84 slideably receives the rod 78.

The connection 82 further comprises a biasing coil spring 87 which is coaxially mounted on the rod 78, and the spring is held between a nut 88 fixed on the rod 78 and the shoulder 85. By design, the spring 87 biases the shoulder 85 toward the stop nut 83, while permitting the shoulder to move away from the stop nut against the biasing force of the spring 87.

A control rod advancing and retracting means 90 is provided for selectively moving the control rod 78 in either direction along its axis to thereby pivot the arm 60 in either direction about the pivotal axis 70. The advancing and retracting means 90 includes the actuating hand wheel 80 which is threaded on the rod 78 and which is positioned to abut the outside surface of the side wall 25 of the hopper 24. The advancing and retracting means 90 further includes a second biasing coil spring 92 which is coaxially received on the rod 78 on the inside of the side wall 25, and which is held between a nut 93 fixed on the rod 78 and the side wall 25. The second biasing coil spring 92 is thus configured to bias the control rod 78 toward the left as seen in FIG. 6, i.e. in a direction tending to pivot the arm 60 in a withdrawal direction wherein the arm is partially withdrawn from the slots of the elements. Such movement is resisted by the engagement of the wheel against the side wall 25.

The control rod 78 is held against significant rotation by means of a pair of radial pins 95, 96 which are mounted on the stop nut 83. As best seen in FIGS. 7 and 7A, the stop nut 83 is fixed to the rod 78 by means of a lock pin (not shown) and is positioned adjacent the angle bracket 86. Thus when the actuating wheel 80 is rotated in the clockwise (CW) direction, the pin 95 engages the angle bracket 86 to prevent further rotation of the nut and the rod, and when the actuating wheel is rotated in the counterclockwise (CCW) direction, the nut 83 and rod 78 are free to rotate only approximately 90° at which point the pin 96 engages the bracket 86 and prevents further rotation of the rod 78.

From the above description, it will be seen that rotation of the actuating wheel 80 in a CW direction axially moves the rod 78 to the right (FIG. 6) and against the biasing force of the coil spring 92 to pivot the arm in the entering direction, note FIG. 5. Rotation of the wheel in the CCW direction permits the coil spring 92 to move the control rod 78 in the opposite axial direction wherein the arm 60 is pivoted in the withdrawal direction. Also, it will be noted that the coil spring 92 holds the actuating wheel 80 against the outside surface of the side wall 25 of the hopper 24.

Thus to adjust the machine to process nuts of smaller size, the wheel 80 is rotated CW to move the arm 60 further into the slots 47, note FIG. 8. To process larger nuts, the wheel 80 is rotated CCW to partially withdraw the arm from the slots, note FIG. 8A.

It will also be noted that the right end of the control rod 78 as seen in FIG. 6 extends axially beyond the actuating wheel 80 and mounts a nut 97. The length of the rod which extends between the wheel 80 and the nut 97 thus provides the machine operator with a reliable visual indication of the position of the arm 60 within the slots 47. This feature facilitates the initial set up of the machine when the size of the nuts being processed is changed.

In the preferred embodiment, the right end portion of the control rod 87 as shown in FIG. 6 is provided with Acme threads having a predetermined pitch of for example 1/10 inch. Thus the operator is able to determine the axial travel of the rod 87 and the pivotal movement of the arm 60 with each revolution of the actuating wheel 80.

FIG. 9 illustrates an alternative embodiment of the connection between the control rod 87 and the arm 60. In this embodiment, a ball socket 99 is mounted to the end of the rod, and a bolt 100 extends through the leg 75 and secures the ball socket thereto. The right end of the control rod 78 may include an advancing and retracting means 90 as seen in FIGS. 5 and 6.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiment disclosed and that modifications and other embodiments are intended to be included within the scope of the appended claims. Although specific terms are employed herein, they are used in a generic and descriptive sense only and not for purposes of limitation.

That which is claimed:

1. An apparatus for successively delivering nuts in a predetermined orientation to a cracking head of a nutcracker, and comprising
    a hopper for storing a relatively large quantity of the nuts to be cracked,
    an endless conveyor having an upper run extending through said hopper to a delivery point exteriorly thereof, with said conveyor comprising a feed chain and a plurality of nut transport elements mounted in succession on said feed chain, with each element including opposite sides and a generally semicircular, laterally extending receptacle which faces upwardly during movement of the element through said hopper and to said delivery point, and with each receptacle communicating with each of said opposite sides of the associated element and being sized to supportingly receive a single nut to be cracked which is orientated with its end to end direction extending along the receptacle,
    wherein said apparatus further comprises means for laterally ejecting any nuts in excess of one from the receptacle of each nut transport element and so that they are ejected from the receptacle on one of said sides thereof, said ejecting means comprising a longitudinal slot communicating with the full length of the side of each nut transport element opposite said one side thereof and also communicating with the associated receptacle, with the slot extending laterally a substantial portion of the distance across the element, and with said ejecting means further comprising an arm, and means mounting said arm in said hopper so that the arm extends laterally into the slot of each advancing element and thereby deflects each excess nut therein from the receptacle on said one side,
    means including an actuating member located on the outside of a side wall of hopper for adjusting the lateral extent to which the arm extends into the slots of the advancing elements, to thereby permit adjustment for differently sized nuts which are being processed by the nutcracker, and
    wherein said arm is pivotally mounted in said hopper for movement about a pivotal axis which is perpendicular to the direction of advance of the advancing nut transport elements, and so that pivotal movement of the arm about said pivotal axis causes the lateral extent to which the arm extends into the slots to be varied.

2. The apparatus of claim 1 wherein said adjusting means further comprises a control rod connected between the arm and the actuating member, and a control rod advancing or retracting means for selectively moving the control rod in either direction along its axis to thereby pivot the arm in either direction about said pivotal axis, said control rod advancing and retracting means including said actuating member.

3. The apparatus of claim 2 wherein the control rod is connected to the arm by a spring loaded connection which comprises a stop mounted on the rod and a shoulder fixedly mounted with respect to the arm and so that the shoulder engages the stop to limit pivotal movement of the arm in an entering direction in which the arm enters the slots of the advancing elements, and said spring loaded connection further comprising a spring biasing member for biasing the shoulder toward the stop while permitting the shoulder to move away from the stop against the force of the spring biasing member and wherein the arm pivots in a withdrawal direction in which the arm partially withdraws from the slots.

4. The apparatus of claim 3 wherein the control rod is externally threaded, and wherein the actuating member comprises a wheel threadably connected to the control rod, with the wheel abutting the outside of a side wall of the hopper, and wherein said control rod advancing and retracing means further includes a second spring biasing member for biasing the control rod in a direction tending to pivot the arm in said withdrawal direction, so that rotation of the wheel in a first direction moves the rod against the biasing force of the second spring biasing member and in an axial direction to pivot the arm in said entering direction, and rotation of the wheel in the opposite direction permits the second spring biasing member to move the control rod in the opposite axial direction wherein the arm is pivoted in the withdrawal direction.

5. The apparatus of claim 2 wherein the control rod is connected to the arm by a connection which comprises a ball socket connector interconnected between the control rod and said arm.

6. The apparatus of claim 5 wherein the control rod is externally threaded, and wherein the actuating member comprises a wheel threadably connected to the control rod, with the wheel abutting the outside of a side wall of the hopper, and wherein said control rod advancing and retracting means further includes a spring biasing member for biasing the control rod in a direction tending to pivot the arm in a withdrawal direction in which the arm partially withdraws from the slots of the advancing elements, so that rotation of the wheel in a first direction moves the rod against the biasing force of the spring biasing member and in an axial direction to pivot the arm in an entering direction in which the arm enters the slots of the advancing elements, and rotation of the wheel in the opposite direction permits the spring biasing member to move the control rod in the opposite axial direction wherein the arm is pivoted in the withdrawal direction.

7. The apparatus of claim 1 wherein the arm is in the form of a flat plate having a thickness sufficient to permit one edge of the plate to enter the slots of the advancing elements, and with said one edge having an abutment at the leading end thereof which serves to rake out any shell fragments from the slots of the advancing elements.

8. The apparatus of claim 1 further comprising
means for lifting the advancing nuts in succession from the nut transport elements at the delivery point and advancing the removed nuts in succession from the delivery point along a generally curvilinear path of travel, and
means for imparting a cracking force to each nut while being advanced along the curvilinear path of travel.

9. The apparatus of claim 8 wherein the means for lifting and advancing the nuts comprises
a turret mounted for rotation about a central axis which is perpendicular to and above the upper run of the endless conveyor at the delivery point, and
a drive for rotating the turret about the central axis, and
said means for imparting a cracking force comprises a plurality of cracking units mounted to said turret so as to extend parallel to each other and to said central axis.

10. The apparatus of claim 1 further comprising a plate positioned so as to overlie the path of the nut transport elements as the elements move along the upper run of the conveyor and past the location at which the arm enters the slots of the advancing elements, and with the plate being mounted by means of a horizontal pivotal connection adjacent the upstream end of the plate such that the plate may be lifted upwardly from the advancing elements.

* * * * *